United States Patent [19]
Hayles et al.

[11] Patent Number: 6,067,584
[45] Date of Patent: May 23, 2000

[54] ATTRIBUTE-BASED SYSTEM AND METHOD FOR CONFIGURING AND CONTROLLING A DATA ACQUISITION TASK

[75] Inventors: Tim Hayles; James A. Bednar, both of Austin, Tex.

[73] Assignee: National Instruments Corporation, Austin, Tex.

[21] Appl. No.: 08/711,128

[22] Filed: Sep. 9, 1996

[51] Int. Cl.[7] .............................. G06F 3/00; G06F 13/10
[52] U.S. Cl. .............................. 710/10; 710/14; 702/127; 702/187; 709/302; 709/303
[58] Field of Search .................................. 702/127, 187; 709/302, 303; 710/10, 14

[56] References Cited

U.S. PATENT DOCUMENTS 5,926,775  7/1999  Brumley et al. ...................... 702/127

OTHER PUBLICATIONS

Grady Booch, "Object–Oriented Analysis and Design," The Benjamin/Cummings Publishing Company, Inc., 2nd ed., pp. 293–304, 1994.

T. Yokoyama et al., "An object–based distributed computing environment based on a reflectiive architecture," IEEE Distributed Computing Systems, pp. 263–270, Jun. 1995.

Z. Abdelouahab et al., "Programming concurrency and synchronization in Actel," IEEE Parallel and Distributed Systems, pp. 189–196, Jun. 1996.

J.P. McKinney et al., "A data acquistion and analysis systme for coastal ocean measurements," IEEE Oceans, vol. 2, pp. 560–564, Sep. 1996.

Q. Yang et al., "An object–oriented model of measurement systems," IEEE Instrumentation and Measurement Technology Conference, vol. 1, pp. 690–693, May 1997.

*Primary Examiner*—Thomas C. Lee
*Assistant Examiner*—Albert Wang
*Attorney, Agent, or Firm*—Conley, Rose & Tayon PC; Jeffrey C. Hood

[57] ABSTRACT

A data acquisition system comprising a computer system, coupled to a data acquisition device, a data acquisition application executing on the computer system, and device interface software with an attribute-based API executing on the computer system. The attribute-based API enables the data acquisition application to perform steps to control the data acquisition device. The steps comprise creating a task for controlling the data acquisition device, setting values of the attributes of the task and device, starting the task acquiring data, and destroying said task. Creating the task comprises allocating an attribute database comprising a plurality of attribute objects corresponding to the attributes of the data acquisition device and an attribute table referencing the plurality of attribute objects. The attribute objects comprise environment data containing values of the attributes and a function for setting the values of the attributes. The attribute table comprises attribute table entries. Each of the attribute table entries references a respective attribute object. The attribute table is indexed by a portion of a unique attribute number associated with each of the attributes. The lookup time associated with invoking the attribute setting function is constant regardless of a number of the attributes. Each attribute has an associated unique number portions of which specifies the datatype and I/O type of the attribute, when the attribute may be set, and the index of the attribute into the appropriate attribute table. A new attribute may be added to the API and existing applications may link to or invoke functions of the new API without modification.

37 Claims, 8 Drawing Sheets

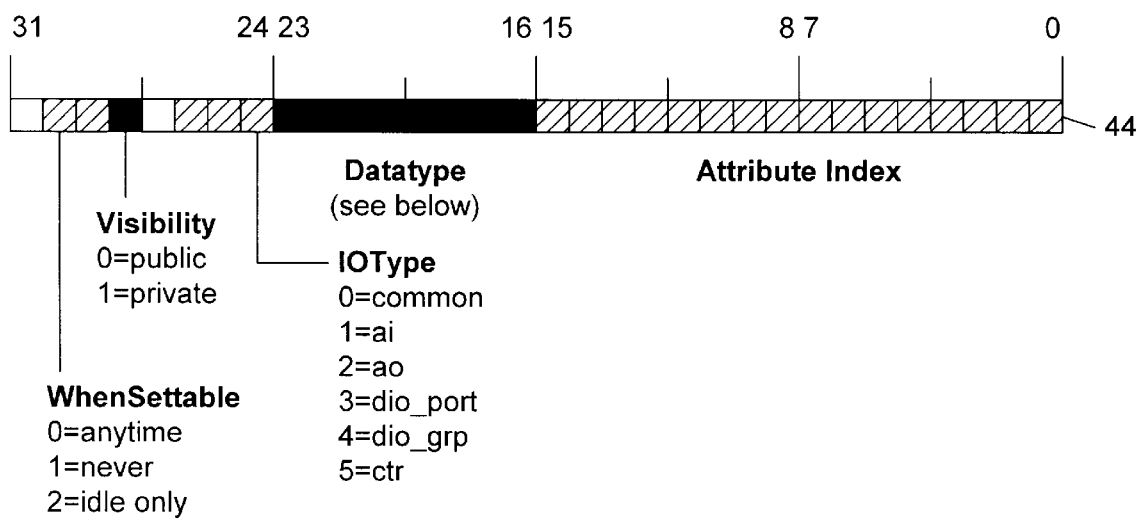
API Attribute Number Bitmap
API Datatype Bitmap
Fig. 6

ATTRIBUTE-BASED SYSTEM AND METHOD FOR CONFIGURING AND CONTROLLING A DATA ACQUISITION TASK

BACKGROUND OF THE INVENTION

1. Field of the Invention

The present invention relates to data acquisition (DAQ) systems comprising application software, device interface software, and DAQ hardware and particularly such systems in which the device interface software provides an Application Programming Interface (API) to the application software.

2. Description of the Related Art

Scientists and engineers often use DAQ systems to perform a variety of functions, including laboratory research, process monitoring and control, data logging, analytical chemistry, test and analysis of physical phenomena, and control of mechanical or electrical machinery, to name a few examples. A DAQ system typically includes transducers and other detecting means for providing "field" electrical signals representing a process, physical phenomena, equipment being monitored or measured, etc. For example, detectors and/or sensors are used to sense the on/off state of power circuits, proximity switches, push-button switches, thermostats, relays or even the presence of positive or negative digital logic-level signals.

A typical DAQ system comprises a computer system with DAQ hardware, wherein the DAQ hardware is typically plugged into one of the I/O slots of the computer system. The field signals are provided to the DAQ hardware. In another common DAQ system configuration, the DAQ hardware is coupled to the computer system via other means such as through a VXI (VME eXtensions for Instrumentation) bus, a GPIB (General Purpose Interface Bus), a serial port, or parallel port of the computer system. Optionally, the DAQ hardware comprises signal conditioning modules which receive the field signals and condition the signals to be acquired.

The DAQ hardware is configured and controlled by DAQ software executing on the computer system. The DAQ software for configuring and controlling the DAQ system typically comprises of two portions: the device interface software and the application software, or the application. The device interface software serves to interface the DAQ hardware to the application. The device interface software, is typically supplied by the manufacturer of the DAQ hardware or by some other third party software vendor. The application is typically developed by the user of the DAQ system and is tailored to the particular function which the user intends the DAQ system to perform. The DAQ hardware manufacturer or third party software vendor sometimes supplies the application software for some applications which are common, generic or straightforward.

Referring now to FIG. 1, a block diagram of portions of a DAQ system illustrating the relationship between a DAQ application 12, DAQ device interface software with an enumerated function API 14, and DAQ hardware 16 is shown. The DAQ hardware 16 has associated attributes. Common examples of DAQ hardware attributes and/or attributes of the software controlling the DAQ hardware 16 are the range of input values (voltages, currents, etc.) which the DAQ hardware will acquire; the manner of coupling the DAQ hardware 16 to the field signals (e.g., DC or AC); the input mode of the acquired signals (e.g., differential or single-ended); various acquisition trigger related attributes such as trigger mode, trigger source, trigger action, trigger level, etc.; attributes relating to acquisition clocks; the size of the buffer for receiving the acquired data; and the engineering units associated with the values of the acquired data.

The DAQ application 12 provides the interface to the user of the DAQ system, configures the attributes (such as those previously listed) of the DAQ hardware 16 and controls the DAQ hardware 16 to perform the acquisition of data, typically in response to input from the user. For example, in a DAQ system for acquiring analog input signals from a television set, the application may call functions of the device interface software to configure the values of the trigger level, sample rate, and upper and lower input voltage levels of the DAQ hardware. Then the application may call upon the device interface software to control the DAQ hardware to begin acquiring data from the television set and then stop acquiring data at a certain point in time or upon detection of a certain event, such as a buffer for the acquired data becoming full.

The device interface software 14 commonly includes, inter alia, low-level device drivers for communicating with the DAQ hardware 16. In particular, the device drivers perform input/output operations to DAQ hardware 16 registers and memory, service interrupts from the DAQ hardware 16, perform data transfers from or to the DAQ hardware 16 and execute at the required operating system privilege level to access the DAQ hardware 16. In addition, the device interface software 14 typically comprises function libraries or dynamic link libraries (DLL) which the application 12 may either link with or execute, respectively. The libraries contain functions which the application 12 invokes to configure and control the DAQ hardware 16. An example of DAQ device interface software 14 is the NI-DAQ product developed by "NATIONAL INSTRUMENTS CORPORATION."

The device interface software 14 provides a specified interface to the functions in its libraries. This interface is commonly referred to as the Application Programming Interface (API) since it specifies the interface which the application software program 12 uses to access the library functions. The API specifies, inter alia, the function names, the input parameters for each function, the acceptable values of the input parameters, and the output values of each function. The prior art device interface software 14 of FIG. 1 presents an enumerated function API for the application 12. A enumerated function API typically specifies a different function to set and/or get the value of each attribute. Further, the enumerated function API specifies a different function for each control action (i.e., start, stop, pause, resume, etc.) to be performed. Thus, with enumerated function API DAQ systems, a relatively large number of function calls exist in the API to accommodate the large number of attributes of the DAQ system.

Enumerated function API's often prove to be difficult to expand, scale and maintain. As new DAQ hardware is employed, new attributes associated with the new hardware must be configured. Hence, the API must be expanded by adding new functions to the API, or the existing functions must be changed to accommodate the new attributes. For example, consider a function in an enumerated function API for setting the data acquisition clock source. Suppose the caller of the current function specifies a parameter to choose an internal clock source, a counter output clock source, or an I/O connector pin clock source associated with integer values 0, 1 or 2, respectively, of the input parameter. Then a new DAQ board is developed which provides yet a fourth type of clock source, which is not provided for in the current function. The new clock source allows a choice of one of a large number of signals from an external bus to be chosen as the clock source. The function must now be changed.

One possible solution is to change the function to associate a value 3 of the input parameter with the new clock source and add another input parameter which specifies which of the large number of external bus signals is to be the clock source. However, applications which assume the old function will no longer work with the new device interface software, i.e., they will either not compile with the new library functions (due to the added parameter in the parameter list) or they will cause errors when attempting to invoke the new library functions. Thus, existing applications which desire to use the new device interface software for reasons other than to utilize the new clock source attributes (such as to enjoy the benefit of bug fixes, code efficiency or performance) would have to be modified.

Another possible solution is to obsolete the old function name and create a new function with a new name and parameter list. However, again, existing applications would have to be modified to use the new device interface software. Further, if the number of attribute changes becomes relatively large over time, the numerous changes to the API may become very undesirable from a maintenance perspective.

Hence, DAQ device interface software providing an API which avoids the disadvantages of an enumerated function API, that is, an API which is more expandable, scaleable and maintainable, is desired.

SUMMARY OF THE INVENTION

The present invention provides a data acquisition system comprising attribute-based API device interface software which is advantageously more expandable scaleable and maintainable than enumerated function API device interface software.

Broadly speaking the data acquisition system comprises a computer system, coupled to a data acquisition device, a data acquisition application executing on the computer system, and device interface software with an attribute-based API executing on the computer system which enables the data acquisition application to perform steps to control the data acquisition device. The steps comprise creating a task for controlling the data acquisition device, setting values of the attributes of the task and device, starting the task, acquiring data, and destroying the task.

Creating the task comprises allocating an attribute database comprising a plurality of attribute objects corresponding to the attributes of the data acquisition device and an attribute table referencing the plurality of attribute objects. The attribute objects comprise environment data containing values of the attributes and a function for setting the values of the attributes.

The attribute table comprises attribute table entries. Each of the attribute table entries references a respective attribute object. The attribute table is indexed by a portion of a unique attribute number associated with each of the attributes. The attribute database may comprise a plurality of attribute tables. The attribute database further comprises an I/O type table referencing the plurality of attribute tables. Examples of the I/O type are analog input, analog output, digital I/O, and counter/timer. The I/O type table is indexed by a portion of a unique attribute number associated with each of the attributes.

According to an alternate embodiment, the attribute database comprises a plurality of I/O type tables, and the attribute database further comprises a device table referencing the plurality of I/O type tables. The device table is indexed by a device number associated with the data acquisition device.

The data acquisition application passes a task string to the device interface software when creating the task. The task string specifies a device number associated with the device and the I/O type of the device.

Each attribute has an associated unique name and number. A portion of the attribute number specifies the datatype of the attribute. Another portion specifies when the attribute may be set. Another portion specifies the I/O type associated with the attribute. Another type specifies whether or not the attribute is public, i.e., visible to the application or private, i.e., only visible to the device interface software. Another portion specifies the index in the appropriate attribute table.

The data acquisition application sets values of the attributes by invoking the functions of the attribute objects in the attribute database. The lookup time associated with invoking the attribute setting function is constant regardless of a number of the attributes. Destroying the task comprises freeing the memory allocated for the attribute database.

Further, the API of the present invention advantageously provides the ability to add new attributes to the API without having to recompile existing software applications.

Therefore, the present invention provides an attribute-based Application Programming Interface (API) for data acquisition systems. The present invention is thus more expandable, scaleable, and maintainable than prior art data acquisition API's.

BRIEF DESCRIPTION OF THE DRAWINGS

A better understanding of the present invention can be obtained when the following detailed description of the preferred embodiment is considered in conjunction with the following drawings, in which:

FIG. 6 illustrates the bitmap format of attribute numbers associated with the attribute database of FIG. 4;

DETAILED DESCRIPTION OF THE PREFERRED EMBODIMENT

DAQ System

Figure 1:
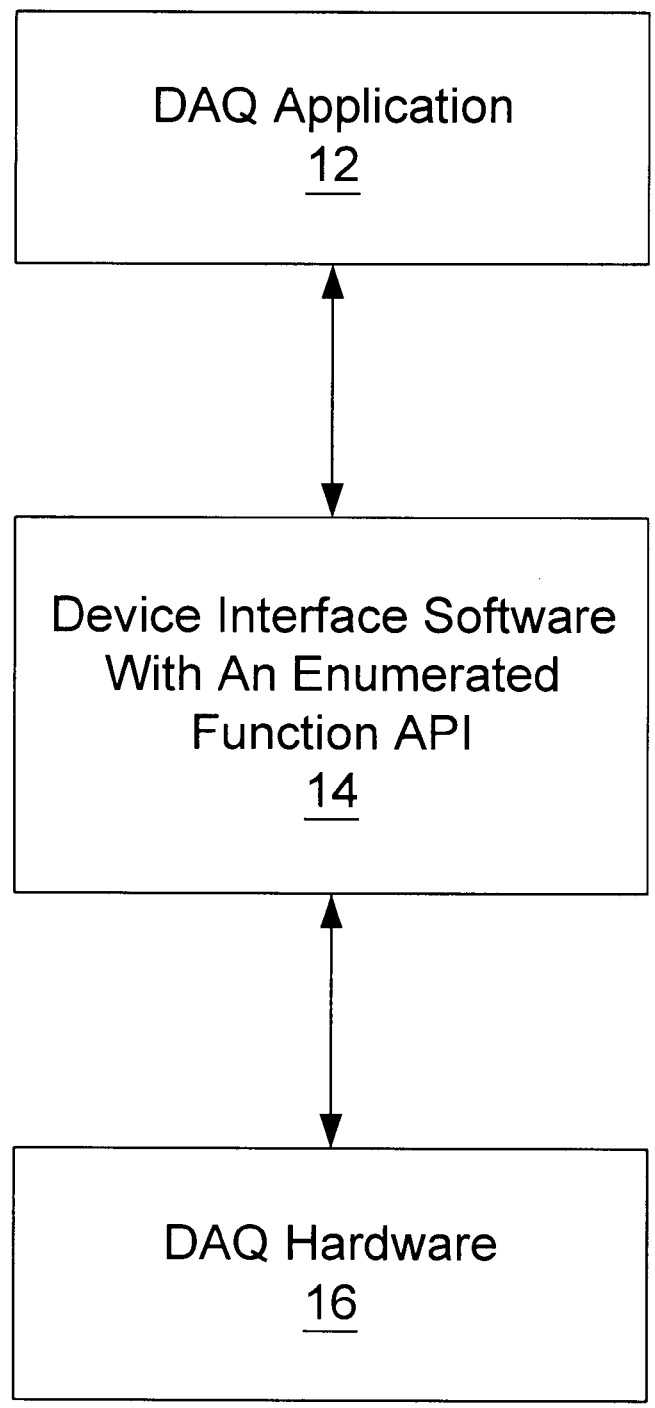
FIG. 1 is block diagram of portions of a DAQ system according to the prior art.
Figure 2:
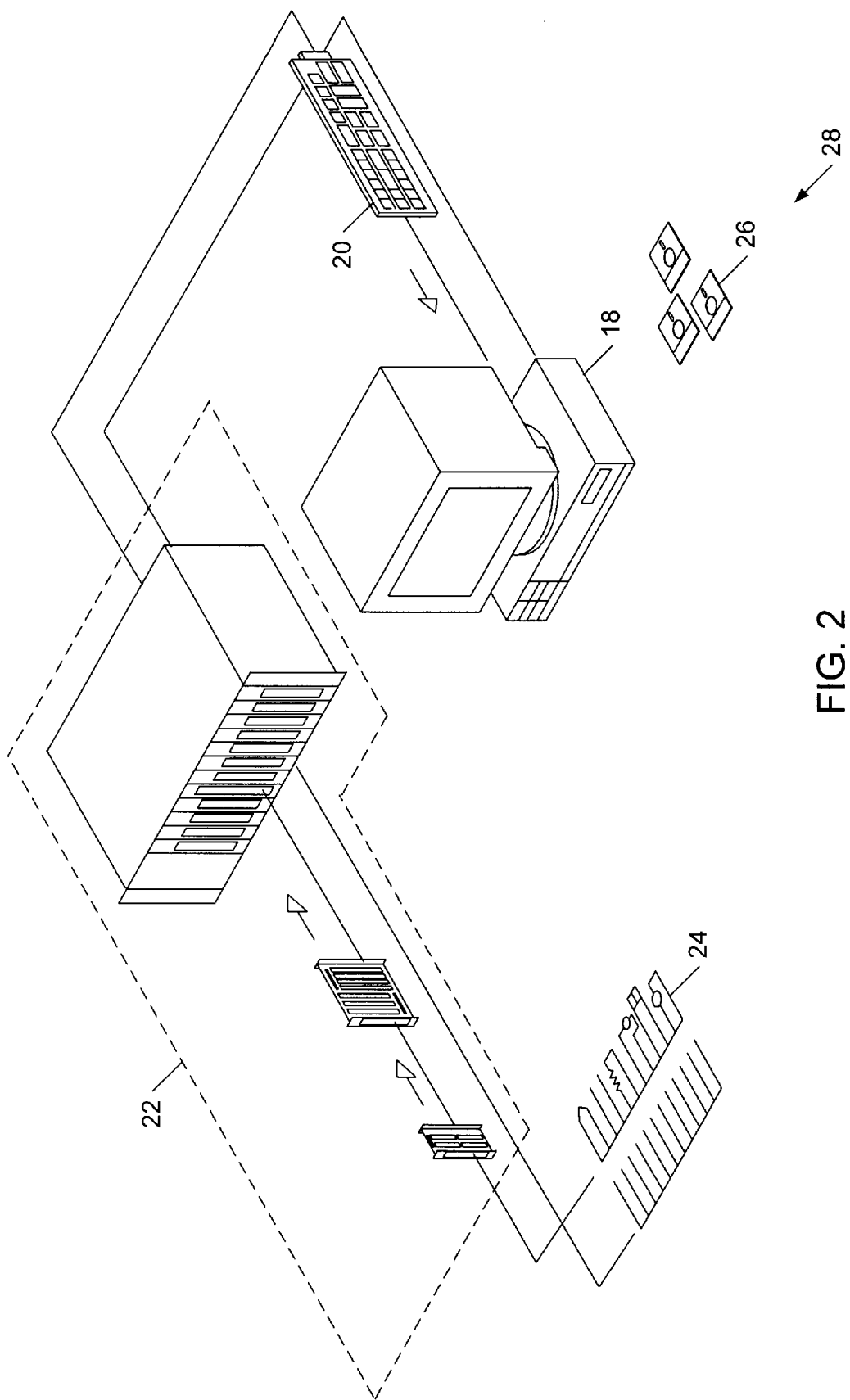
FIG. 2 illustrates a DAQ system according to the present invention.

Referring now to FIG. 2, an illustrative DAQ system 28 according to the present invention is shown. The system 28 comprises a computer 18 running an operating system, a DAQ device 20, coupled to the computer 18, and transducers 24 or other detecting means which provide field electrical signals to the DAQ device 20 optionally through signal conditioning circuitry 22. The computer 18 includes various standard components, including at least one central processing unit (CPU), memory, a hard drive, one or more buses, and a power supply. The computer 18 preferably includes a memory media, such as magnetic media, or floppy disk(s)

26, on which computer programs according to the present invention are stored. The software programs of the present invention are also stored in the system memory and/or hard drive of the computer 18 and executed by the CPU. The CPU executing code and data from the memory thus comprises a means for configuring and controlling the DAQ device 20 to acquire data from the field signals according to the steps described below.

In one embodiment, the computer 18 comprises input/output (I/O) slots into which the DAQ device 20 is coupled. In another embodiment, the computer 18 comprises a VXI (VME Extensions for Instrumentation) chassis and bus, a GPIB (General Purpose Interface Bus), a serial port or parallel port by which the DAQ device 20 is coupled to the computer 18. Examples of computer 18 are IBM-compatible personal computers, APPLE MACINTOSH computers, and SUN MICROSYSTEM workstations and operating systems which execute on them.

In one embodiment, the transducers 24 are coupled directly to the DAQ device 20. In another embodiment, the transducers 24 are conditioned by the signal conditioning circuitry 22 for presentation to the DAQ device 20 as shown. An example of signal conditioning circuitry 22 is Signal Conditioning Extensions for Instrumentation (SCXI) circuitry. SCXI is an open architecture, multi-channel signal conditioning front-end system for DAQ devices. SCXI comprises an external chassis housing signal conditioning modules for amplifying, multiplexing, and isolating field signals. The signal conditioning modules advantageously reduce the introduction of noise into the signals transmitted to the DAQ device 20. The term "data acquisition" used in this specification is intended to encompass data generation as well as data acquisition, particularly as applied to instrumentation and process control systems.

The transducers 24 and other detecting means provide the field signals representing a process, physical phenomena, equipment being monitored or measured, etc. to the DAQ device 20. Examples of the transducers 24 are strain gauges, thermocouples, thermistors, photoconductive cells, microphones, and piezoelectric transducers, among others.

The DAQ device 20 is configured to acquire or generate signals of distinct I/O types. In particular, the I/O types comprise analog input signals, analog output signals, digital input signals, digital output signals and counter/timer inputs and outputs. The analog input and output signals are received and generated, respectively, on analog "channels" of the DAQ device 20. The digital input and output signals are received and generated, respectively, on digital I/O "ports" of the DAQ device 20. Each channel, port or counter has an associated number which uniquely identifies it with respect to the DAQ device 20 on which it resides. Henceforth, the term "channel" is used to denote an analog channel, a digital port, or counter collectively unless otherwise indicated.

Examples of DAQ device 20 are the following products available from NATIONAL INSTRUMENTS CORPORATION: the AT-MIO-16 series analog input boards, the AT-AO-6/10 series analog output boards, the PC-DIO-96 digital I/O board, and the PC-TIO-10 counter/timer I/O board. Examples of the SCXI circuitry 22 are the NATIONAL INSTRUMENTS CORPORATION SCXI-1000 4-slot chassis, the SCXI-1100 32-channel multiplexer amplifier module, and SCXI-1160 16-channel power relay module.

Figure 3:
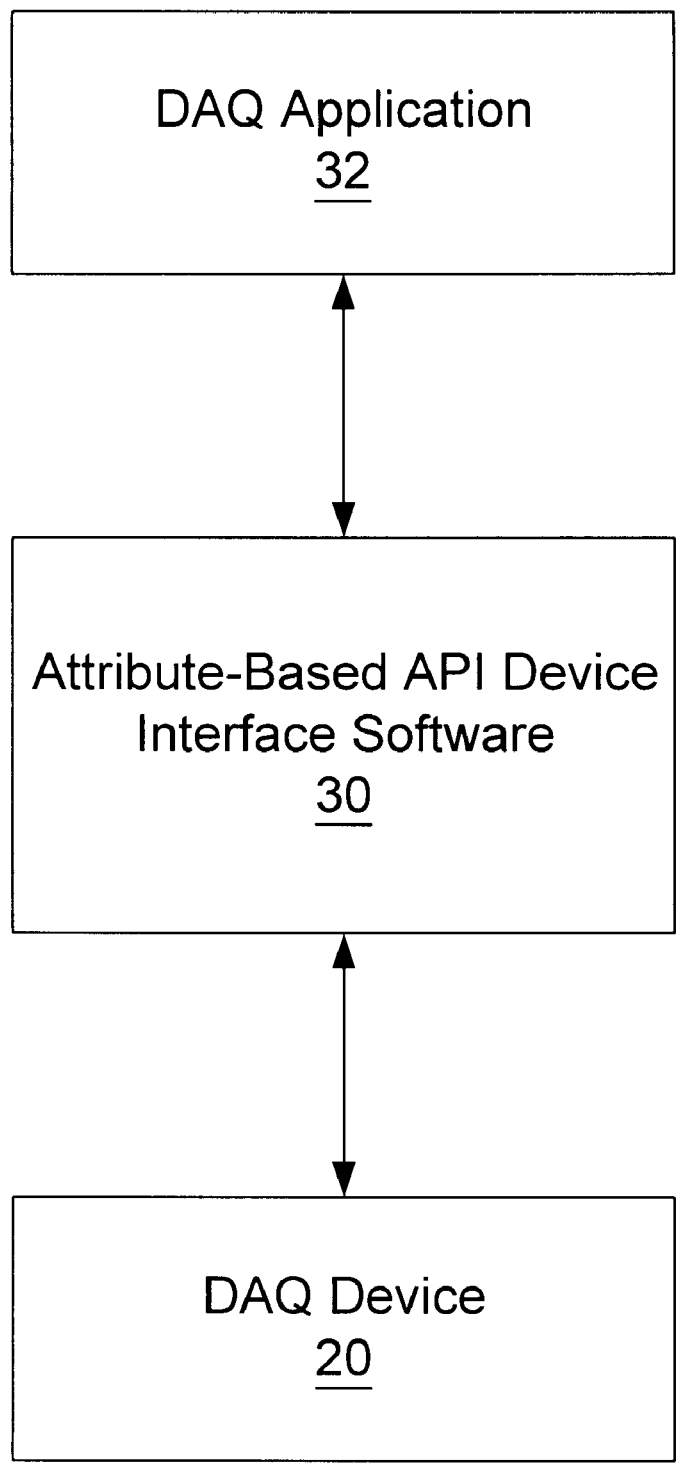
FIG. 3 is a block diagram of portions of the DAQ system of FIG. 2.

FIG. 3—DAQ Software Block Diagram

Referring now to FIG. 3, a block diagram illustrating the relationship of portions of the DAQ system 28 (of FIG. 2) is shown. DAQ application software 32 interfaces with attribute-based API device interface software 30 according to the present invention to configure and control the DAQ device 20 (of FIG. 2). The device interface software 30 advantageously provides an attribute-based API to the DAQ application 32, thus providing a more expandable, scaleable and maintainable API as described herein than enumerated function API's.

The device interface software 30 provides a means for the DAQ application 32 to interface to the DAQ device 20. The device interface software 30 comprises device drivers for communicating with the DAQ device 20. The device drivers perform input/output operations to registers on the DAQ device 20 or perform memory transfers to shared memory on the DAQ device 20 to configure and control the DAQ device 20. The device drivers also service interrupts from the DAQ device 20 and perform direct memory access data transfers from or to the DAQ device 20 when appropriate. Further, the device drivers interact with the operating system executing on the computer 18 to perform such operations as allocating memory for the DAQ application 32 and device interface software 30 itself. The device drivers execute at the required privilege level to perform the aforementioned operations.

The device interface software 30 comprises a function library object code file which is linked with the DAQ application 32 object files. The device interface software 30 further comprises a dynamic link library (DLL) containing executable functions which the DAQ application 32 calls during execution of the DAQ application 32. The device interface software 30 comprises a relatively small function name space. In particular, the function name space comprises of a task create function, an attribute set function, an attribute get function, a task control function, and a task destroy function. These functions are DaqTaskCreate, DaqAttributeSet, DaqTaskControl, DaqAttiributeGet, and DaqTaskDestroy, respectively. These functions will be discussed in greater detail with regard to the sample program below, but are syntactically listed here:

DaqTaskCreate (taskString, taskID)
DaqAttributeSet (taskID, taskString, attributeName, attributeValue)
DaqTaskControl (taskID, controlCode)
DaqAttributeGet (taskID, taskString, attributeName, attributeValue)
DaqTaskDestroy (taskID)

Many of the various functions, macros and other related values referenced as C language source code throughout this specification may be found in the three C language header files, nli_api.h, nli_type.h, and nli_attr.h found in appendix A.

The device interface software 30 comprises a relatively large attribute name space, i.e., there are a relatively large number of attribute names associated with each of the attributes which may be set or gotten via the DaqAttributeSet and DaqAttributeGet routines, respectively. The present invention contemplates an attribute browser to aid users in navigating the relatively large attribute name space of the device interface software 30.

The DAQ application 32 provides an interface to the user of the DAQ system 28. The user receives output via output devices of the computer 18, such as a display screen, and provides input via input devices such as a mouse or keyboard of the computer 18 (of FIG. 2) to direct the acquisition of field signal data. In addition, the DAQ application 32 calls functions of the device interface software 30 to configure the attributes of the DAQ device 20, DAQ system 28, or a DAQ task to control the acquisition of field signal data by the system 28.

A task comprises the notion of viewing a data acquisition or data generation operation as an entity having a state consisting of the values of a set of attributes. A task can be created, which involves defining storage locations and default values for the set of attributes. A task can be controlled, which involves translating the set of attributes into programming instructions culminating in the arming of active hardware components such as analog to digital converters, triggers and clocks. A task can have the set of attributes changed, which involves validating and storing the new attribute values. A task can be destroyed, which involves deallocating storage for the set of attributes.

DAQ Application

Figure 4:
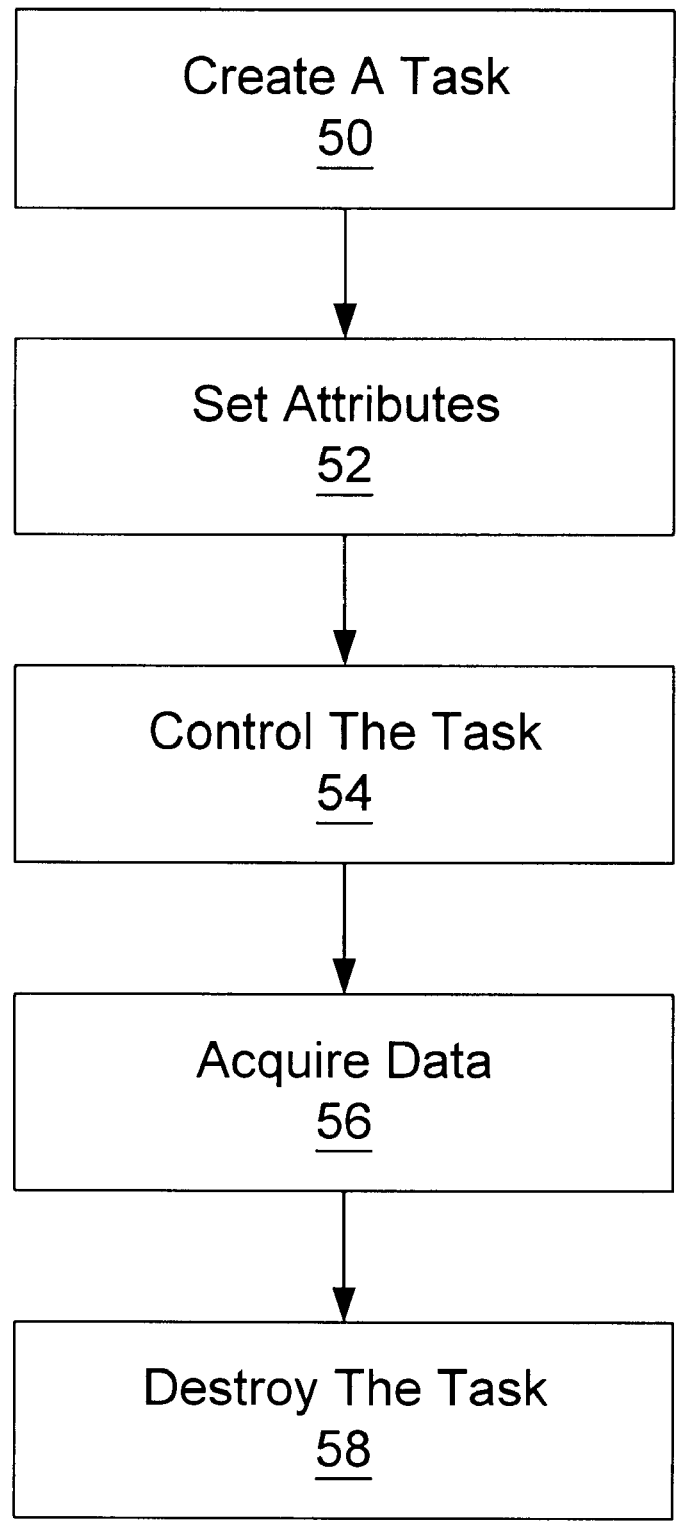
FIG. 4 is a flowchart illustrating steps taken by the DAQ application of FIG. 3 to configure and control the DAQ system of FIG. 2 to perform data acquisition.

Referring now to FIG. 4, a flowchart illustrating steps taken by the DAQ application 32 (of FIG. 3) to configure and control the system 28 (of FIG. 2) are shown. First, the DAQ application 32 creates a task to perform the data acquisition in step 50. The DAQ application 32 invokes the DaqTaskCreate function provided by the device interface software 30 (of FIG. 3) to create the task.

Once the task has been created, the DAQ application 32 configures the task by setting attributes of the DAQ device 20 (of FIG. 2) and the task, such as data buffer sizes, in step 52. The DAQ application 32 invokes the DaqAttributeSet function provided by the device interface software 30 to set the attributes. The manner in which attributes are set is described below. The possible attributes in the data acquisition system 28 include the range of input values (voltages, currents, etc.) which the DAQ device 20 will acquire; the manner of coupling the DAQ device 20 to the field signals (e.g., DC or AC); the input mode of the acquired signals (e.g., differential or single-ended); various acquisition trigger related attributes such as trigger mode, trigger source, trigger action, trigger level, etc.; attributes relating to acquisition clocks; the size of the buffer for receiving the acquired data; and the engineering units associated with the values of the acquired data.

Once the task has been configured, the DAQ application 32 controls the task in step 54, in particular to start the DAQ device 20 acquiring data. The DAQ application 32 invokes the DaqTaskControl function provided by the device interface software 30 to control the task. The DAQ application 32 supplies a parameter to the task control function to specify the type of control operation to be performed, in particular starting the task, pausing the task, resuming the task or clearing the task.

Once the DAQ device 20 has acquired the data, the DAQ application 32 reads the data from the DAQ device 20 into buffers in the memory of the computer 18 (of FIG. 2) in step 56. The DAQ application 32 invokes the DaqAttributeGet function provided by the device interface software 30 to read the data. Once the data acquisition has completed, the DAQ application 32 destroys the task in step 58 by invoking the DaqTaskDestroy function provided by the device interface software 30.

Exemplary DAQ Application Program

Below is exemplary source code of a C language DAQ application program embodying the steps taken in FIG. 4 to configure and control a DAQ system. The program is representative of an analog input DAQ application.

```
#include <stdio.h>
#include "nli_api.h"
#define        NUM_SCANS           50
#define        NUM_CHANNELS        4
#define        LOWER_LIMIT         -5.0F
#define        UPPER_LIMIT         5.0F
#define        SCAN_RATE           4096.0F
main( )
{
    char               *taskString ="dev1 ! ai 3:0";
    short              buffer[NUM_SCANS*NUM_CHANNELS];
    long               scansRead;
    NLITaskID          taskID;
    /*
    ** create the task
    */
    DaqTaskCreate(taskString, &taskID);
    /*
    ** set the attributes of the task
    */
    DaqAttributeSet(taskID, taskString, NLI_ATTR_AI_READ_DATA_TYPE, NLI_RAW_I16);
    DaqAttributeSet(taskID, taskString, NLI_ATTR_AI_SCANS_PER_BUFFER, NUM_SCANS);
    DaqAttributeSet(taskID, taskString, NLI_ATTR_AI_LOWER_LIMIT, LOWER_LIMIT);
    DaqAttributeSet(taskID, taskString, NLI_ATTR_AI_UPPER_LIMIT, UPPER_LIMIT);
    DaqAttributeSet(taskID, taskString, NLI_ATTR_AI_SCAN_CLOCK_RATE, SCAN_RATE);
    DaqAttributeSet(taskID, taskString, NLI_ATTR_AI_SCANS_TO_READ, NUM_SCANS_;
    /*
    ** start the DAQ device acquiring data
    */
    DaqTaskControl(taskID, NLI_START_FINITE);
    /*
    ** read the data from the DAQ device into the application buffer and
    ** then determine how many scans were actually read
    */
    DaqAttributeGet(taskID, taskString, NLI_ATTR_AI_READ_BUFFER, buffer);
    DaqAttributeGet(taskID, taskString, NLI_ATTR_AI_SCANS_READ, &scansRead);
    /*
    ** destroy the task
    */
    DaqTaskDestroy(taskID);
```

-continued

```
/*
** print out the data value for each channel for each scan read
for (scan = 0; scan < scansRead; scan++)
*/
{
  printf ("scan %d: ", scan)
  for (channel = 0; channel < NUM_CHANNELS; channel++)
    printf ("ch%d:%8d ", buffer[scan * channel]);
  printf("\n");
  }
}
```

The program comprises a main routine which performs the steps of the flowchart of FIG. 4 and then prints out for the user the values of the data acquired. The main routine creates a data acquisition task by calling the DaqTaskCreate function of the device interface software 30 with a task string and a pointer to a task ID variable to be populated by the device interface software 30.

The task string specifies a device number, an I/O channel type, and one or more I/O channel, port or counter numbers of the DAQ device 20. The task string has a characteristic format, or grammar. Two task string grammars are provided in the present invention: one for DAQ devices such as DAQ device 20, and one for SCXI modules. In the program example above, the task string for a DAQ device is used. For the grammars described below, items in brackets are optional. Items separated by a vertical bar (|) are exclusive choices; exactly one of these options can be specified. The pound sign (#) is replaced by a number. The superscript star (*) indicates that the preceding term can be repeated any number of times, including zero. White spaces are allowed anywhere except within a symbol or a number. Only the items in bold are entered literally.

The grammar for a task string is defined as follows.

dev #[!] ai|ao|dio|ctr #[,#|:#]*

The pound sign (#) following the dev symbol is replaced with the device number associated with the DAQ device 20. The ai, ao, dio, or ctr symbol specifies the I/O channel type. The pound sign following the I/O channel type is replaced by the channel number, port number or counter number. Examples of task strings are:

| | |
|---|---|
| "dev 1 ! ai 0:7" | means analog input channels 0 through 7 on device 1. |
| "dev 1 ai0:7" | means the same as the above string, but all optional characters and spaces have been left out. |
| "dev 1 ! ai 0,2,4" | means analog input channels 0, 2 and 4 on device 1. |
| "dev 2 ! ctr 0" | means counter/timer 0 on device 2. |

The grammar for a task string that describes an SCXI module channel is defined as follows.

dev #[!] [ob #[!]] sc #[!] md #[!] ch #[,#|:#]*

The pound sign (#) following the dev symbol is replaced with the device number of the DAQ device to which the SCXI module is attached. The ob symbol is optional. When present it specifies the onboard channel of the DAQ device that the SCXI channels are multiplexed down to. When the ob symbol is omitted, onboard channel 0 is used. The pound sign following the sc symbol is replaced with the chassis id number of the SCXI module. The pound sign following the md symbol is replaced with the slot number of the SCXI module channels included in the task. The pound sign(s) following the ch symbol are the channels or ports of the SCXI module. Examples of SCXI module channel strings are:

"dev 1 ! ob 0 ! sc 1 ! md 2 ! ch 0: 31"
    means channels 0 though 31 on the module in slot 2 of the SCXI chassis with ID 1 multiplexed down to onboard channel 0 of DAQ device 1.

"dev1sc1md2ch0:31"
    means the same as the above string, but all optional characters and spaces have been left out.

In the main routine the task string "dev1 ! ai 3:0" passed to the DaqTaskCreate function specifies a device number of 1, an I/O type of analog input, and 4 channels, denoted 0 through 3.

The device numbers specified in the task string correspond to device numbers assigned by the user of the DAQ system 28 prior to executing the DAQ application 32. The user runs a configuration utility to assign the device numbers to each DAQ device 20 in the system 28. The configuration utility is preferably run and the device numbers assigned after the DAQ device 20 is installed in the system 28 and prior to running the DAQ application 32. The configuration utility stores the device number assignments along with associated information supplied by the user (such as the I/O port address, DMA channel, interrupt request level, etc. about the DAQ device 20) in persistent storage of the computer 18, such as may reside on a disk drive within the computer 18. As indicated in Table 2 infra, some of the default attribute values are assigned via the configuration utility.

When the main routine invokes the DaqTaskCreate function, the device interface software 30 creates a task which comprises allocating an attribute database, which will be described in more detail in the discussion of FIGS. 5 and 6. Once the device interface software 30 creates the task, the DaqTaskCreate routine returns a valid task ID in the task ID variable. The task ID is used in future API function calls to the device interface software 30 associated with this task. It is a unique ID which specifies the task associated with a given function call.

After creating the task, the main routine makes a series of calls to the DaqAttributeSet routine to set various attributes associated with the task, DAQ device 20, and DAQ system 28, in particular the operating system of the DAQ system 28. In each of the DaqAttributeSet calls the task ID, the task string, an attribute name, and an attribute value is passed to the function. The task string for any given call to DaqAttributeSet may be different depending upon the characteristics of the attribute being set. That is, the task string passed to the DaqAttributeSet function need not be the same as that passed to the DaqTaskCreate function.

The attribute name comprises a characteristic string of characters as seen in the main routine. Each attribute name is associated with a hexadecimal attribute number. The significance and format of the attribute numbers will be described later in the discussion of FIG. 6. The association between attribute names and attribute numbers is accomplished by C language macro statements exemplified here:

define NLI_ATTR_AI_READ_DATA_TYPE 0x0104001B.

A more exhaustive listing of the analog input I/O type attributes may be found in the nli_attr.h file in appendix A.

Each attribute name begins with the prefix NLI_ATTR_ indicating that it is an attribute name. Each attribute name in the API begins with this prefix. The next portion of the name indicates the I/O type of the attribute. Since the main routine supra is directed at analog input data acquisition, each of the attribute names set or gotten comprises an additional AI_ portion indicating that the attributes are analog input I/O channel type attributes.

When the DaqAttributeSet routine is called, the device interface software 30 invokes functions of the attribute database created by the DaqTaskCreate routine to set the specified attribute. Setting the specified attribute comprises modifying environment data associated with the attribute and/or communicating with the DAQ device 20, depending upon the nature of the attribute. For most attributes, the current value of the attribute may be gotten from the attribute database environment data via the DaqAttributeGet routine. The operation of the attribute database functions and environment data will be described in more detail in the discussion of FIGS. 5 and 6.

In this example, the DAQ device 20 will be performing a multiple-channel scanned data acquisition. The number of channels to scan is 4, indicated by the NUM_CHANNELS macro. The number of scans to be performed is 50, as indicated by the NUM_SCANS macro. The data will be acquired with an input voltage range of −5.0 volts to +5.0 volts as indicated by the LOWER_LIMIT and UPPER_LIMIT macros. The DAQ device 20 will perform the scan at a scan rate of 4096 scans per second as indicated by the SCAN_RATE macro. Each data sample acquired will be in a "raw", i.e., unscaled, 16 bit format. Thus the main routine allocates the variable buffer which is an array of 16 bit values, the number of elements in the array being the number of channels multiplied by the number of scans to be performed.

The main routine first sets the data type of the data samples to be acquired by setting the NLI_ATTR_AI_READ_DATA_TYPE attribute to indicate that the data samples will be 16 bit data samples and will be unscaled, or raw. Next the main routine sets the NLI_ATTR_AI_SCANS_PER_BUFFER attribute. When the NLI_ATTR_AI_SCANS_PER_BUFFER attribute is set, the device interface software 30 allocates an internal buffer to store data which will later be read by the DAQ application 32 into the application buffer, buffer. The internal buffer resides in the memory of the computer 18 and is distinct from the application buffer and any FIFO buffers which may reside on the DAQ device 20. The internal buffer allocated by the device interface software 30 has elements of size according to the NLI_ATTR_AI_READ_DATA_TYPE attribute, and the number of elements in the internal buffer is determined by the attribute value passed during the DaqAttributeSet call of the NLI_ATTR_AI_SCANS_PER_BUFFER attribute.

Next the main routine sets the NLI_ATTR_AI_LOWER_LIMIT and NLI_ATTR_AI_UPPER_LIMIT attributes to define the input voltage range of the data acquisition. Next the main routine set the NLI_ATTR_AI_SCAN_CLOCK_RATE attribute. Next, the main routine sets the NLI_ATTR_AI_SCANS_TO_READ attribute to indicate the number of scans per channel which the task desires the DAQ device 20 to perform.

Once the attributes of the task have been set, the main routine starts the data acquisition by calling the DaqTaskControl routine. The DaqTaskControl routine is used to control operations of the DAQ device 20 governed by a hardware timing signal. In this example, the routine is used to start a finite clocked acquisition for analog input. The DaqTaskControl routine may also be used to, inter alia, start a clocked generation for analog output, start handshaked digital I/O and/or start a counter/timer. The DaqTaskControl function receives two arguments: the task ID and a control code argument specifying the control operation, i.e., the action to be performed. The supported control code argument values are:

| | |
|---|---|
| NLI_START_FINITE | Start a finite operation. |
| NLI_START_CONTINUOUS | Start a continuous operation. |
| NLI_PAUSE | Pause the current operation immediately. |
| NLI_RESUME | Resume the current paused operation. |
| NLI_CLEAR | Stop the current operation and free buffers. |

When the DaqTaskControl routine is invoked, the device interface software 30 communicates with the DAQ device 20 to perform the specified control operation. A finite operation stops after all buffers are filled or emptied exactly once. A continuous operation does not stop until a subsequent call to DaqTaskControl is made with a control code of NLI_CLEAR, or when the task is destroyed invoking DaqTaskDestroy.

Control operations may also be performed by calling the DaqAttributeSet function and specifying the NLI_ATTR_CONTROL_CODE attribute name and the control code argument as the attribute value. The following function invocation is equivalent to the DaqTaskControl call in the main routine:

DaqAttributeSet (taskID, taskString, NLI_ATTR_CONTROL_CODE, NLI_START_FINITE);

Once the DAQ device 20 has acquired the data, the main routine reads the data from the DAQ device 20 into the application buffer, buffer, by calling the DaqAttributeGet function, specifying the NLI_ATTR_AI_READ_BUFFER attribute and passing the address of the application buffer. In response, the device interface software 30 communicates with the DAQ device 20 to transfer the data from the DAQ device 20 to the application buffer. The data transfer is typically performed in one of two manners, either direct memory access (DMA) transfer or by what is commonly referred to as "programmed I/O", depending upon the capabilities of the DAQ device 20. Programmed I/O encompasses data transfers in which the CPU of the computer 18 executes input instructions to individually read bytes or words of data from registers or memory on an I/O device and write the data to the memory of the computer 18, or vice versa in the case of a data transfer from memory to the device.

Thus, by providing a single read buffer attribute, the API of the present invention provides a consistent buffer model across all I/O interface types. That is, the present invention alleviates the need to have a separate read data function depending upon the data associated with the I/O type, such as analog input data versus digital input data.

If all of the data associated with the requested number of scans is available, the device interface software 30 transfers the data to the application buffer. However, if the data is not yet available, the device interface software 30 waits up to an amount of time specified by the NLI_ATTR_AI_READ_TIME_LIMIT attribute. If all of the requested scans have not completed by the time the limit has expired, the call to read the data returns. In all cases the device interface software 30 sets the NLI_ATTR_AI_SCANS_READ attribute value to the number of scans which were successfully completed.

In the example DAQ application 32, the main routine does not set the NLI_ATTR_AI_READ_TIME_LIMIT attribute and therefore accepts the default value. The time limit attribute defaults to letting the device interface software 30 calculate an appropriate time limit based on the acquisition clocks being used, or to use 1 second if external timing is being used.

The main routine then calls the DaqAttributeGet function specifying the NLI_ATTR_AI_SCANS_READ attribute and passing a pointer to a scansRead variable to determine how many of the scans requested according to the NLI_ATTR_AI_SCANS_PER_BUFFER attribute were actually performed. The device interface software 30 populates the scansRead variable with the number of scans which were actually performed.

Once the data has been read into the application buffer, the main routine destroys the task by calling the DaqTaskDestroy routine with the task ID of the task. When the DaqTaskDestroy routine is invoked the device interface software 30 stops any data acquisition in progress for the task indicated by the task ID and deallocates any memory associated with the task, such as those created by setting the NLI_ATTR_AI_SCANS_PER_BUFFER attribute, as described previously. The DaqTaskDestroy routine deallocates the attribute database which was created when the task was created. Additionally, the DaqTaskDestroy routine performs the equivalent of a call to DaqTaskControl with a control code of NLI_CLEAR.

Attribute Database

Figure 5:
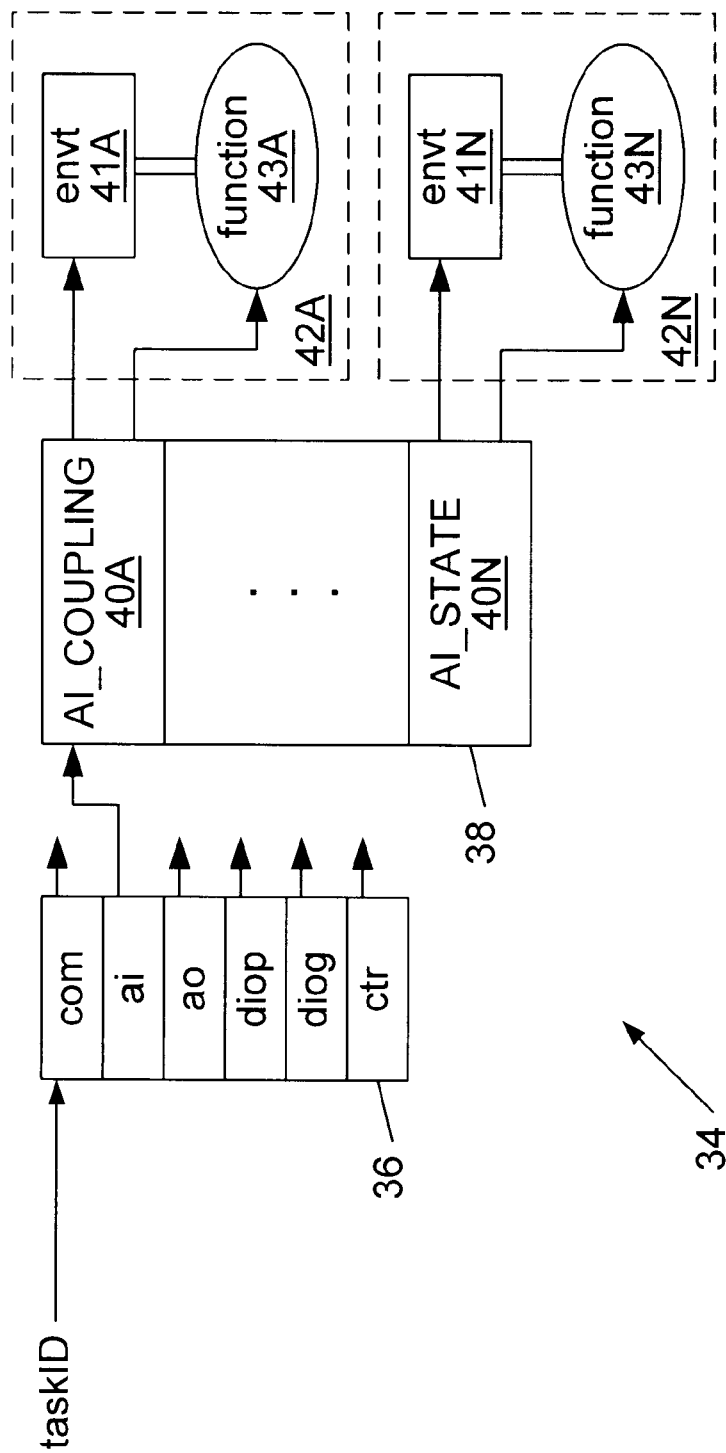
FIG. 5 is a block diagram of an attribute database of the device interface software of FIG. 3.

Referring now to FIG. 5, a block diagram of an attribute database 34 of the device interface software 30 (of FIG. 3) according to the present invention is shown. The attribute database 34 comprises an I/O type table 36 referencing a plurality of attribute tables 38, and a plurality attribute objects 42A–42N (referred to collectively as 42) referenced by the attribute tables 38. FIG. 5 shows a single attribute table 38.

The I/O type table 36 comprises an entry associated with each I/O type of DAQ device 20 (of FIG. 2). In one embodiment of the present invention, the list of I/O types comprises a common I/O type (com), an analog input I/O type (ai), an analog output I/O type (ao), a digital I/O port type (diop), a digital I/O group type (diog), and a counter/timer I/O type (ctr). The I/O type table 36 is indexed by a portion of the attribute number associated with the attribute name passed to the DaqAttributeSet and DaqAttributeGet routines. The format of the attribute number will be described in more detail in the discussion of FIG. 6.

Each entry in the I/O type table 36 selectively contains a reference to an attribute table 38. The I/O type table 36 entries either contain a NULL reference or a reference to an attribute table 38 depending upon the I/O type associated with the task as specified by the task string passed to the DaqTaskCreate routine. The com entry in an I/O type table 36 always contains a reference to a common attribute table regardless of the I/O type of the task. The I/O type table 36 is referenced by the task ID returned by the DaqTaskCreate routine.

Attribute object 42A is representative of the attribute objects 42 and will be referred as such for clarity. An attribute object 42A comprises environment data 41A, or properties, and a method, or function 43A for operating upon the environment data 41A. The environment data 41A comprises variables which contain the value of the attribute. When an attribute is set, e.g., via a call to DaqAttributeSet, the attribute value passed to the DaqAttributeSet routine is passed to the function 43A associated with the attribute specified in the call of DaqAttributeSet. The function 43A assigns the attribute value it received to the appropriate variable in its environment data 41A.

Conversely, when the DaqAttributeGet routine is called, the function 43A associated with the attribute specified in the call of DaqAttributeGet is called. The function 43A reads the appropriate variable in its environment data 41A and passes the value of the variable back to the DaqAttributeGet routine which in turn passes the value back to the DAQ application 32.

Each attribute table 38 comprises a plurality of attribute object entries 40A–40N (referred to collectively as 40). Each of the attribute object entries 40 is associated with a different attribute and contains two pointers to a respective one of the attribute objects 42. One pointer references the environment data 41A of the attribute object 42A and the other pointer references the function 43A of the attribute object 42A. The attribute table 38 is also indexed by a portion of the attribute number.

Thus, when the DaqAttributeSet or DaqAttributeGet routine is called, the device interface software 30 uses a portion of the attribute number passed it as a parameter to index into the I/O type table 36 to access the appropriate attribute table 38 associated with the attribute being set or gotten, i.e., the attribute associated with the attribute number passed. The device interface software 30 subsequently uses a portion of the attribute number to index into the attribute table 38 to access the appropriate one of the attribute objects 42 associated with the attribute being set or gotten. The device interface software 30 then invokes the function 43A of the appropriate attribute object 42A to operate on the environment data 41A to set or get the specified attribute.

In one embodiment the I/O type table 36 and the attribute table 38 are advantageously implemented as arrays, such as those defined by the C language. Thus, the lookup time required for the device interface software 30 to find the attribute object specified by the attribute number is constant, regardless of the number of attributes supported or the number of I/O types supported by the attribute-based API of the present invention.

Attribute Number Bitmap

Referring now to FIG. 6, an illustration of the bitmap format of attribute numbers associated with the attribute database of FIG. 4 is shown. Each attribute number 44 comprises a 32 bit unsigned integer. The attribute number 44 comprises an index portion, a datatype portion, an I/O type portion, a visibility portion and a whenSettable portion.

The I/O type portion comprises three bits and is thus capable of specifying up to 8 different I/O types. One bit is reserved and could be used to expand the number of I/O types to 16. As previously mentioned, in one embodiment six different I/O types are defined with index values shown in FIG. 6: a common I/O type (common=0), an analog input I/O type (ai=1), an analog output I/O type (ao=2), a digital I/O port type (dio_port=3), a digital I/O group type (dio_grp=4), and a counter/timer I/O type (ctr=5). The I/O type portion of the attribute is used to index into the I/O type table 36 (of FIG. 5) to reference the appropriate attribute table 38 (of FIG. 5) associated with the specified attribute number passed to the DaqAttributeSet and DaqAttributeGet routines.

The index portion comprises 16 bits and is thus capable of specifying up to 65,536 different attributes for each I/O type. Index 0 is reserved. Attributes are assigned index numbers consecutively beginning with 1. When a new attributes is added, that attribute receives the next available index. The index chosen for a given attribute has no significance other than indices must be chosen consecutively, i.e., with no gaps.

The visibility bit of the attribute number denotes whether or not the attribute is available to the "public", i.e., to users of the API, or is private to the device interface software 30 itself. If the DAQ application 32 attempts to set a private attribute, the device interface software 30 will return an error status.

The whenSettable portion of the attribute number comprises a 2 bit field and indicates if and when the attribute may be set. Some attributes may never be set, but only gotten, i.e., they are read-only. Some may be set only when the task is idle, i.e., when the task is not performing data acquisition. Some attributes may be set any time. If the DAQ application 32 (of FIG. 3) attempts to set an attribute with a whenSettable value of 1, i.e., never, the device interface software 30 will return an error status. Likewise, if the DAQ application 32 attempts to set an attribute with a whenSettable value of 2, i.e., idle only, when the task is not idle, the device interface software 30 will return an error status.

The datatype portion 46 of the attribute number indicates the corresponding C language data type of the attribute. The datatype portion 46 of the attribute number comprises three fields: a size field, a kind field and a pointer bit. The pointer bit indicates whether or not the attribute value is a pointer. The kind field is a 2 bit field which denotes whether or not the attribute value is an unsigned integer, a signed integer, a floating point number, or a void data type. The size field indicates the number of bytes of storage used to store the attribute value. If the value is a pointer, then the size field indicates the size of what is pointed to, not the size of the pointer. If the value is a pointer to an array, the size field indicates the size of a single element in the array, as opposed to the length of the array.

Table 1 provides a listing of one embodiment of the common I/O type attributes and Table 2 provides a listing of one embodiment of the attributes associated with the analog input I/O type. The tables specify the attribute name, datatype, whenSettable, and default values associated with each attribute listed.

TABLE 1

| Attribute Name | Data Type | Category | When Settable | Default Value |
| --- | --- | --- | --- | --- |
| NLI_ATTR_CONTROL_CODE | I32 | | Anytime | cleared |

TABLE 2

| Attribute Name | Data Type | Category | When Settable | Default Value |
| --- | --- | --- | --- | --- |
| NLI_ATTR_AI_AMUX_BOARDS | I32 | Accessory | Idle | no AMUX boards |
| NLI_ATTR_AI_BUFFERS_ACQUIRED | I32 | Buffered | Never | |
| NLI_ATTR_AI_BUFFERS_TO_ACQUIRE | I32 | Buffered | Idle | 1 buffer |
| NLI_ATTR_AI_CHAN_CLOCK_POLARITY | I32 | Clocked | Idle | sample on rising signal |
| NLI_ATTR_AI_CHAN_CLOCK_RATE | F32 | Clocked | Idle | (off) |
| NLI_ATTR_AI_CHAN_CLOCK_SOURCE | I32 | Clocked | Idle | internal channel clock |
| NLI_ATTR_AI_CHAN_INDEX | I32 | Multiple | Never | |
| NLI_ATTR_AI_CONDRET_ACTION | I32 | Conditional | Anytime | retrieve on rising signal |
| NLI_ATTR_AI_CONDRET_LEVEL | F32 | Conditional | Anytime | 0.0 Volts |
| NLI_ATTR_AI_CONDRET_MODE | I32 | Conditional | Idle | off |
| NLI_ATTR_AI_CONDRET_OFFSET | I32 | Conditional | Anytime | 0 scans |
| NLI_ATTR_AI_CONDRET_SKIP_COUNT | I32 | Conditional | Anytime | 0 retrieval conditions |
| NLI_ATTR_AI_CONDRET_SOURCE_INDEX | I32 | Conditional | Anytime | channel with index 0 |
| NLI_ATTR_AI_CONDRET_WINDOW | F32 | Conditional | Anytime | 0.0 Volts |
| NLI_ATTR_AI_COUPLING | I32 | Signal Path | Idle | (value set in config. utility) |
| NLI_ATTR_AI_CURRENT_READ_BUFFER | I32 | Buffered | Anytime | buffer number 1 |
| NLI_ATTR_AI_INPUT_MODE | I32 | Signal Path | Idle | (value set in config. utility) |
| NLI_ATTR_AI_LOWER_LIMIT | F32 | Signal Path | Idle | (value set in config. utility) |
| NLI_ATTR_AI_NEXT_SCAN_TO_READ | I32 | Buffered | Never | |
| NLI_ATTR_AI_NUMBER_OF_BUFFERS | I32 | Buffered | Idle | 0 buffers |
| NLI_ATTR_AI_POSTTRIG_DELAY | F32 | Trigger | Idle | 0.0 seconds |
| NLI_ATTR_AI_PRETRIG_SCANS | I32 | Trigger | Idle | 0 scans |
| NLI_ATTR_AI_READ_BUFFER | PVOID | Read | Never | |
| NLI_ATTR_AI_READ_CHANNELS | I32 | Multiple | Anytime | (all channels) |
| NLI_ATTR_AI_READ_DATA_TYPE | I32 | Signal Path | Anytime | scaled F32 data |
| NLI_ATTR_AI_READ_MODE | I32 | Clocked | Anytime | from start of unread data |
| NLI_ATTR_AI_READ_OFFSET | I32 | Buffered | Anytime | 0 scans |
| NLI_ATTR_AI_READ_SCAN_SIZE | I32 | Multiple | Never | |
| NLI_ATTR_AI_READ_TIME_LIMIT | F32 | Read | Anytime | (based on clock rates) |
| NLI_ATTR_AI_SCAN_BACKLOG | I32 | Clocked | Never | |
| NLI_ATTR_AI_SCAN_CLOCK_POLARITY | I32 | Clocked | Idle | scan on rising signal |
| NLI_ATTR_AI_SCAN_CLOCK_RATE | F32 | Clocked | Idle | (off) |
| NLI_ATTR_AI_SCAN_CLOCK_SOURCE | I32 | Clocked | Idle | internal scan clock |
| NLI_ATTR_AI_SCAN_SIZE | I32 | Multiple | Never | |
| NLI_ATTR_AI_SCANS_ACQUIRED | I32 | Buffered | Never | |
| NLI_ATTR_AI_SCANS_PER_BUFFER | I32 | Buffered | Idle | 0 scans |
| NLI_ATTR_AI_SCANS_READ | I32 | Read | Never | |
| NLI_ATTR_AI_SCANS_TO_ACQUIRE | I32 | Buffered | Idle | 1 scan |
| NLI_ATTR_AI_SCANS_TO_READ | I32 | Read | Anytime | 1 scan |
| NLI_ATTR_AI_STATE | I32 | Clocked | Never | |

TABLE 2-continued

| Attribute Name | Data Type | Category | When Settable | Default Value |
|---|---|---|---|---|
| NLI_ATTR_AI_TRIGGER_ACTION | I32 | Trigger | Idle | trigger on rising signal |
| NLI_ATTR_AI_TRIGGER_COUPLING | I32 | Trigger | Idle | (depends on device) |
| NLI_ATTR_AI_TRIGGER_LEVEL | F32 | Trigger | Idle | 0.0 Volts |
| NLI_ATTR_AI_TRIGGER_MODE | I32 | Trigger | Idle | off |
| NLI_ATTR_AI_TRIGGER_SKIP_COUNT | I32 | Trigger | Idle | 0 trigger conditions |
| NLI_ATTR_AI_TRIGGER_SOURCE | I32 | Trigger | Idle | (depends on trigger mode) |
| NLI_ATTR_AI_TRIGGER_WINDOW | F32 | Trigger | Idle | 0.0 Volts |
| NLI_ATTR_AI_UPPER_LIMIT | F32 | Signal Path | Idle | (value set in config. utility) |
| NLI_ATTR_AI_VOLT_SCALE_MULTIPLIER | F32 | Signal Path | Never | |
| NLI_ATTR_AI_VOLT_SCALE_OFFSET | F32 | Signal Path | Never | |

The nli_attr.h file in appendix A provides a C language source code listing, of the assignment of attribute numbers to attribute names for the analog input I/O type.

Alternate Embodiment

Figure 7:
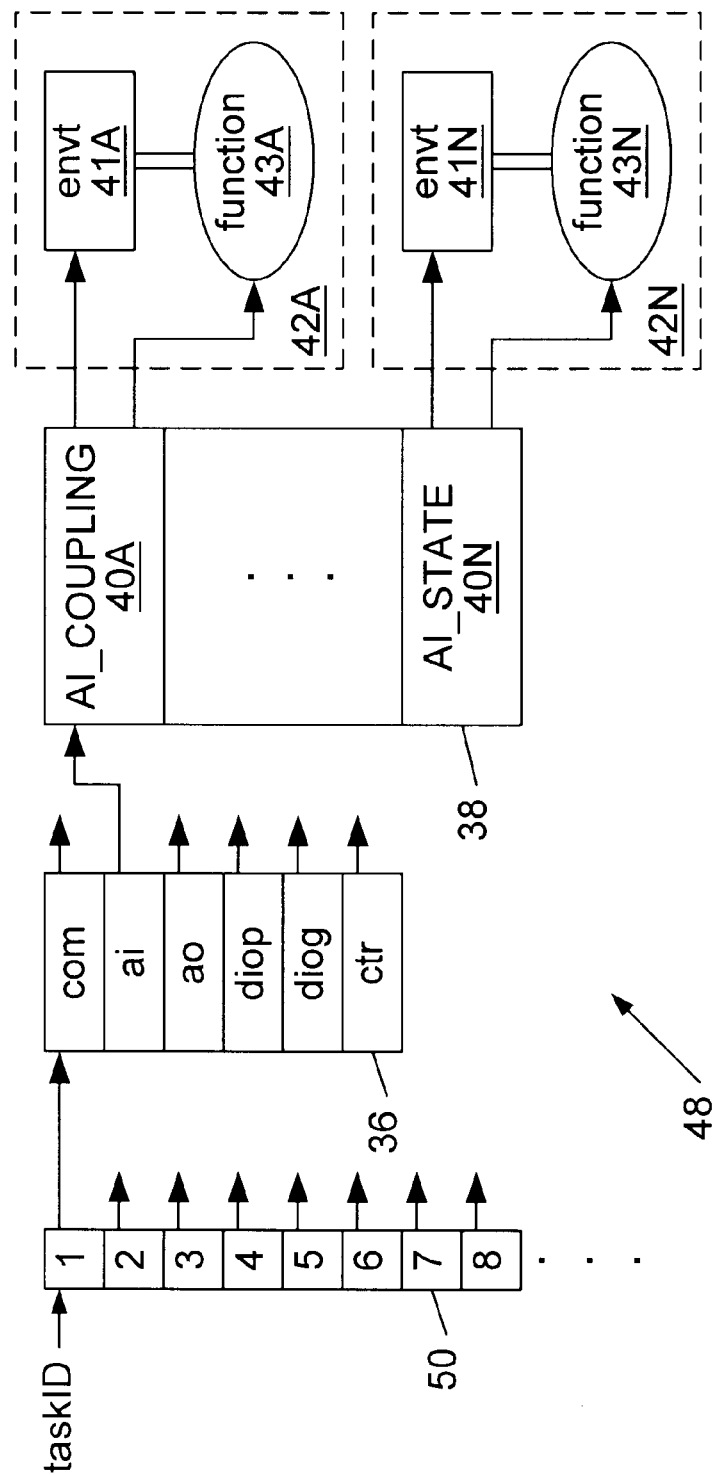
FIG. 7 is a block diagram of an attribute database of the device interface software of FIG. 3 according to an alternate embodiment of the present invention

Referring now to FIG. 7, a block diagram of an attribute database 48 of the device interface software 30 (of FIG. 3) according to an alternate embodiment of the present invention is shown. The attribute database 48 is similar to attribute database 34 of FIG. 5 and corresponding elements are numbered identically for simplicity and clarity. The attribute database 48 further comprises a device table 50. The task ID references the device table 50 rather than the I/O type table 36 (as with the embodiment of FIG. 5) and the device table 50 references one or more I/O type tables 36.

The alternate embodiment provides the DAQ application 32 (of FIG. 3) the ability to specify one or more DAQ devices in the task string passed to the DaqTaskCreate routine. The device interface software 30 creates an I/O type table 36 (and associated attribute table 38 and attribute objects 42) for each device specified. The DAQ devices may be of the same type or of different types. An entry exists in the device table 50 for each device specified in the task string passed to the DaqTaskCreate routine. The task string specifies a device number for each device in the task string. As previously mentioned, the device numbers are assigned by the user to the DAQ devices when the user runs the configuration utility before running the DAQ application 32.

When the DAQ application 32 calls the DaqAttributeSet, DaqAttributeGet or DaqTaskControl routines, the DAQ application 32 passes a task string which specifies the particular device or devices to which the call is directed. The device table 50 is indexed by the device number(s) in the task string passed to the API function call, such as DaqAttributeSet. It is noted that the task string may only be a portion of the task string which was used to create the task.

The present invention contemplates creating a "composite" attribute. A composite attribute is an attribute which causes a plurality of attributes to be set or gotten by a single call to DaqAttributeSet or DaqAttributeGet, respectively. A composite attribute is particularly advantageous in performing configuration of devices wherein a plurality of attribute settings is commonly known and used.

The present invention contemplates a commit feature. The commit feature comprises a boolean commit attribute which may be set to true or false. When the commit attribute is set to false, calls to DaqAttributeSet cause the value of the corresponding attribute to be set to the specified value in the attribute database. However, the attribute value is not written to the device hardware, i.e., it is not committed to the hardware, in the case of attributes which affect hardware settings. Once the task decides to commit to the hardware attributes previously set while the commit attribute was false, the task sets the commit attribute to a true value, which causes the attribute values to be written to the hardware.

The commit feature advantageously provides a means of verifying a particular group of attribute settings as a valid group of settings before committing the group of settings to the hardware device.

Adding an Attribute to the API

When a new attribute is added to the API, a new attribute name and associated attribute number are created, a new attribute object is created and a new attribute object entry which references the new attribute object is added to the appropriate attribute table. A portion of the new attribute number serves as an index into the attribute table to access the new attribute object entry. The new attribute object entry is advantageously added to the end of the attribute table so that the entries which previously existed remain in their place in the table. The new attribute number is chosen to index the new entry. Thus, the old attribute number remains the same and therefore, existing applications may advantageously link with or execute the functions of the new API without modification to the existing application unless the existing application desires to use the new attribute.

Figure 8:
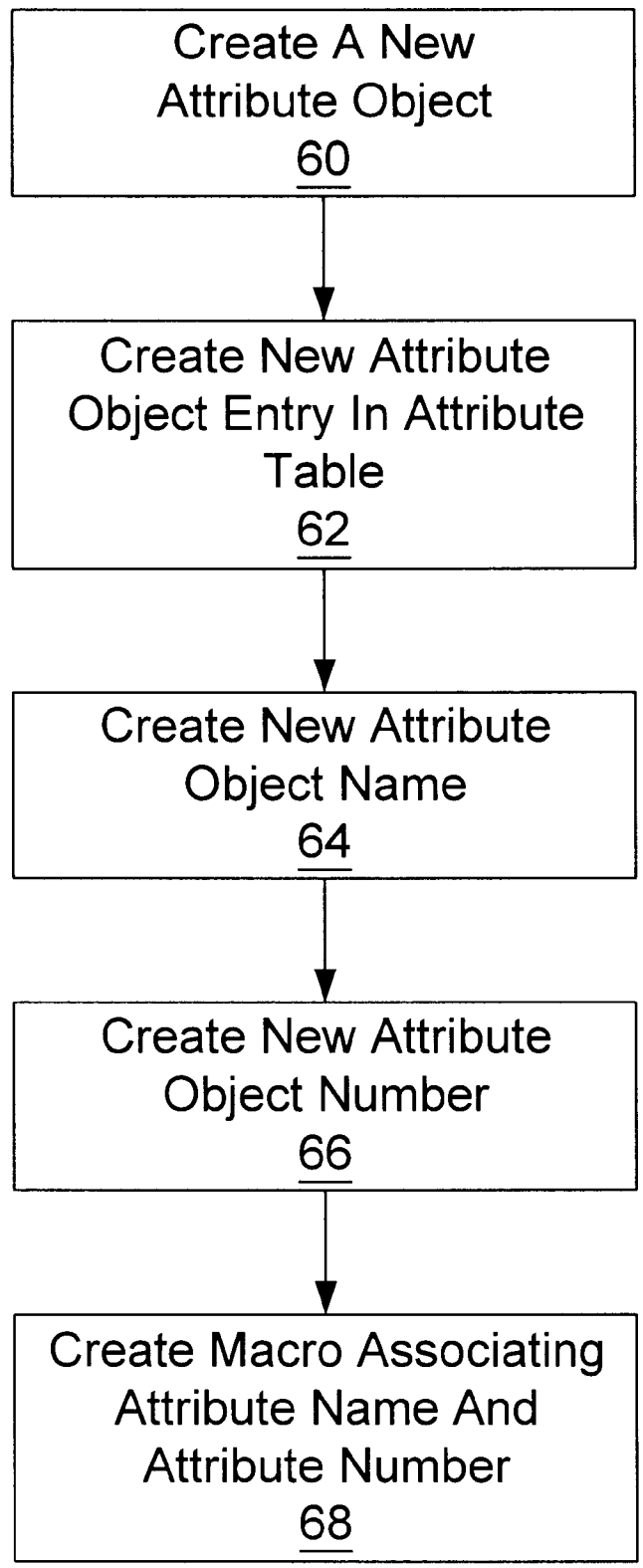
FIG. 8 is a flowchart illustrating steps taken to add a new attribute to the API.

Referring now to FIG. 8, a flowchart illustrating steps taken to add a new attribute to the API is shown. The programmer creates a new attribute object in step 60. The attribute objects 42 (of FIG. 5) are illustrative of the new attribute. As previously described with regard to FIG. 5, the attribute objects comprises environment data for storing the attribute values and a method for operating upon the environment data.

The programmer creates a new attribute object entry in the attribute table which references the new attribute object in step 62. The attribute object entries 40 (of FIG. 5) are illustrative of the new attribute object. The programmer creates an new attribute name for the new attribute in step 64. The new attribute name must be unique with respect to any previously created attribute names within the API. Preferably the new attribute name conforms to previously set conventions for attribute names as may be observed in Tables I and II.

The programmer creates a new attribute number in step 66. The attribute number is created choosing appropriate values for the fields of the attribute number corresponding to the I/O type, the datatype, the visibility of the new attribute, and when the new attribute is settable. Further, the attribute number is created choosing the next available attribute index into the attribute table for the given I/O type. The attribute index corresponds to the new attribute object entry. The programmer creates a macro in the nli_attr.h header file to associate the new attribute name with the new attribute number in step 68.

Thus the present invention advantageously provides an attribute-based API and a method for adding a new attribute to the API wherein existing applications may advantageously link with or execute the functions of the API without modification to the existing application unless the existing application desires to use the new attribute. A new release of the API may also include bug fixes, performance improvements, or code efficiency enhancements from which the existing application may desire to benefit, even though the existing application may not use the new attribute.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An attribute-based method for performing data acquisition in a data acquisition system comprising a data acquisition device having characteristic attributes, the method comprising:

creating a task for controlling the data acquisition device, wherein said creating comprises allocating an attribute database comprising a plurality of attribute objects corresponding to the attributes of the data acquisition device, wherein each of said attribute objects comprises environment data including values of said attributes and a function for setting said values of said attributes, wherein said attribute database further comprises an attribute table referencing said plurality of attribute objects;

setting said values of said attributes to configure the data acquisition device or the task according to a desired configuration;

controlling said task to perform a data acquisition function, wherein said task operates according to said values of said attributes.

2. The method of claim 1, wherein said attribute table comprises attribute table entries, wherein each of said attribute table entries references a respective attribute object wherein said attribute table is indexed by a portion of a unique attribute number associated with each of said attributes.

3. The method of claim 1, wherein said attribute database comprises a plurality of attribute tables, wherein said attribute database further comprises an I/O type table referencing said plurality of attribute tables, wherein said I/O type table is indexed by a portion of a unique attribute number associated with each of said attributes.

4. The method of claim 3, wherein said attribute database comprises a plurality of I/O type tables, wherein said attribute database further comprises a device table referencing said plurality of I/O type tables, wherein said device table is indexed by a device number associated with the data acquisition device, wherein said task is configured to control one or more of said data acquisition devices.

5. The method of claim 1, wherein said creating said task further comprises device interface software returning to a data acquisition application a task ID associated with said task for referencing said attribute database.

6. The method of claim 1, wherein said setting said attribute values further comprises invoking said function for setting said values of said attributes included by said environment data.

7. The method of claim 6, wherein said invoking said function has an associated lookup time, wherein said lookup time is constant regardless of a number of said attributes.

8. The method of claim 1, wherein said controlling said task comprises one or more of the group comprising starting, pausing, resuming and clearing said task.

9. The method of claim 1, further comprising getting said values of said attributes, wherein said function is also for getting said values of said attributes.

10. The method of claim 1, wherein said creating said task comprises a data acquisition application passing a task string to device interface software, wherein said task string specifies a device number and an I/O type of the data acquisition device.

11. The method of claim 1, wherein a unique attribute number is associated with each of said attributes, wherein a portion of said attribute number specifies a datatype of said attribute.

12. The method of claim 1, wherein a unique attribute number is associated with each of said attributes, wherein a portion of said attribute number specifies when said attribute may be set relative to said controlling said task.

13. The method of claim 1, wherein said destroying said task comprises freeing memory allocated for said attribute database.

14. The method of claim 13, further comprising destroying said task.

15. The method of claim 1, wherein said attributes comprise one or more from the group consisting of:

a range of input values to be acquired by the data acquisition device;

a manner of coupling the data acquisition device to field signals;

an input mode of acquired signals;

one or more acquisition trigger related attributes;

buffer related attributes;

channel clock attributes; and input value scaling attributes.

16. A data acquisition system, comprising:

a data acquisition device having characteristic attributes;

a system memory configured to store a task for controlling the data acquisition device, wherein said system memory stores an attribute database comprising a plurality of attribute objects corresponding to the attributes of the data acquisition device, wherein each of said attribute objects comprises environment data including values of said attributes and a function for setting said values of said attributes, wherein said attribute database her comprises an attribute table referencing said plurality of attribute objects; and a processor operably coupled to said data acquisition device and said system memory and configured to set said values of said attributes to configure the data acquisition device or the task according to a desired configuration, and control said task to perform a data acquisition function, wherein said task operates according to said values of said attributes.

17. The system of claim 16, wherein said attribute table comprises attribute table entries, wherein each of said attribute table entries references a respective attribute object, wherein said attribute table is indexed by a portion of a unique attribute number associated with each of said attributes.

18. The system of claim 16, wherein said attribute database comprises a plurality of attribute tables, wherein said attribute database further comprises an I/O type table referencing said plurality of attribute tables, wherein said I/O type table is indexed by a portion of a unique attribute number associated with each of said attributes.

19. The system of claim 18, wherein said attribute database comprises a plurality of I/O type tables, wherein said attribute database further comprises a device table referencing said plurality of I/O type tables, wherein said device table is indexed by a device number associated with said data acquisition device, wherein said task is configured to control one or more of said data acquisition devices.

20. The system of claim 16, wherein said processor executes said function for setting said values of said attributes included by said environment data to set said attribute values.

21. The system of claim 16, wherein said processor further gets said values of said attributes, wherein said function is also for getting said values of said attributes.

22. The system of claim 16, wherein said processor further destroys said task by freeing memory allocated for said attribute database.

23. The system of claim 16, wherein a unique attribute number is associated with each of said attributes, wherein a portion of said attribute number specifies a datatype of said attribute.

24. The system of claim 16 wherein a unique attribute number is associated with each of said attributes, wherein a portion of said attribute number specifies when said attribute may be set relative to said processor controlling said task to perform said data acquisition function.

25. A data acquisition system, comprising:
a data acquisition device having characteristic attributes;
a system memory configured to store instructions; and
a processor operably coupled to said data acquisition device and said system memory and configured to execute said instructions stored in said system memory;
wherein said instructions stored in said memory are operable to execute on said processor to:
create a task for controlling said data acquisition device, wherein said task comprises allocating an attribute database comprising,
a plurality of attribute objects corresponding to said attributes of said data acquisition device, wherein each of said attribute objects comprises environment data including values of said attributes and a function for setting said values of said attributes; and
an attribute table referencing said plurality of attribute objects;
set said values of said attributes;
control said task; and
destroy said task.

26. A data acquisition system, comprising:
a data acquisition device having characteristic attributes;
a system memory configured to store instructions;
means for creating a task for controlling the data acquisition device, wherein said means for creating is operable to allocate an attribute database comprising a plurality of attribute objects corresponding to the attributes of the data acquisition device, wherein each of said attribute objects comprises environment data including values of said attributes and a function for setting said values of said attributes, wherein said attribute database further comprises an attribute table referencing said plurality of attribute objects;
means for setting said values of said attributes to configure the data acquisition device or the task according to a desired configuration; and
means for controlling said task to perform a data acquisition function, wherein said task operates according to said values of said attributes.

27. A computer-readable storage media for operating in a computer system, the computer system including a data acquisition device having characteristic attributes and a processor operably coupled to said data acquisition device, wherein the storage media includes a substrate having a physical configuration representing data, the storage media comprising:
instructions for creating a task for controlling said data acquisition device comprising allocating an attribute database comprising:
a plurality of attribute objects corresponding to said attributes of said data acquisition device, wherein each of said attribute objects comprises environment data containing values of said attributes and a function for setting said values of said attributes; and
an attribute table referencing said plurality of attribute objects;
instructions for setting said values of said attributes;
instructions for controlling said task; and
instructions for destroying said task.

28. The media of claim 27, wherein said attribute table comprises attribute table entries, wherein each of said attribute table entries references a respective attribute object, wherein said attribute table is indexed by a portion of a unique attribute number associated with each of said attributes.

29. The media of claim 27, wherein said attribute database comprises a plurality of attribute tables, wherein said attribute database further comprises an I/O type table referencing said plurality of attribute tables, wherein said I/O type table is indexed by a portion of a unique attribute number associated with each of said attributes.

30. The media of claim 27, wherein said instructions for creating said task further comprises device interface software instructions which return to a data acquisition application a task ID associated with said task for referencing said attribute database.

31. The media of claim 27, wherein said instructions for setting said attribute values further comprise instructions for invoking said function for setting said values of said attributes contained by said environment data.

32. The media of claim 27, wherein said instructions for controlling said task comprises instructions for one or more of the group comprising starting, pausing, resuming and clearing said task.

33. The media of claim 27, further comprising instructions for getting said values of said attributes, wherein said function is also for getting said values of said attributes.

34. The media of claim 27, wherein said instructions for destroying said task comprises instructions for freeing memory allocated for said attribute database.

35. The media of claim 27, wherein said instructions for creating said task comprise data acquisition application instructions for passing a task string to device interface software, wherein said task string specifies a device number and an I/O type of said data acquisition device.

36. The media of claim 27, wherein a unique attribute number is associated with each of said attributes, wherein a portion of said attribute number specifies a datatype of said attribute.

37. The media of claim 27, wherein a unique attribute number is associated with each of said attributes, wherein a portion of said attribute number specifies when said attribute may be set relative to said controlling said task.

* * * * *

UNITED STATES PATENT AND TRADEMARK OFFICE
CERTIFICATE OF CORRECTION

PATENT NO. : 6,067,584
DATED : May 23, 2000
INVENTOR(S) : Tim Hayles and James A. Bednar It is certified that error appears in the above-identified patent and that said Letters Patent is hereby corrected as shown below:

Claim 16, col.20, line 45, please delete "her" and substitute-- further--.

Signed and Sealed this

Twenty-seventh Day of February, 2001

Attest:

NICHOLAS P. GODICI

Attesting Officer    Acting Director of the United States Patent and Trademark Office